(12) United States Patent
Weiner et al.

(10) Patent No.: US 6,203,273 B1
(45) Date of Patent: Mar. 20, 2001

(54) ROTARY MACHINE

(75) Inventors: Harvey I. Weiner, South Windsor; Christopher G. Demers, Willington, both of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/218,704

(22) Filed: Dec. 22, 1998

(51) Int. Cl.$^7$ ............................................. F01D 11/08
(52) U.S. Cl. ........................... 415/173.4; 415/173.5; 415/174.4; 415/131
(58) Field of Search ................. 415/173.4, 173.1, 415/173.2, 173.5, 173.7, 174.4, 174.5, 131, 132, 196, 197, 199.5, 218.1

(56) References Cited

U.S. PATENT DOCUMENTS

| | | | |
|---|---|---|---|
| 2,762,559 | * 9/1956 | Faught | 415/17 |
| 3,183,007 | 5/1965 | Tann . | |
| 4,016,636 | * 4/1977 | Schneider et al. | 415/189 |
| 4,095,005 | 6/1978 | Kishida et al. | 427/376 B |
| 4,199,295 | 4/1980 | Raffy et al. | 415/115 |
| 4,257,735 | 3/1981 | Bradley et al. | 415/174 |
| 4,349,313 | * 9/1982 | Munroe et al. | 415/173.4 |
| 4,426,191 | * 1/1984 | Brodell et al. | 415/189 |
| 4,532,054 | 7/1985 | Johnson | 252/12.4 |
| 4,635,947 | 1/1987 | Hatayama | 277/235 |
| 4,826,397 | 5/1989 | Shook et al. | 415/116 |
| 4,897,021 | 1/1990 | Chaplin et al. | 415/173.7 |
| 5,304,032 | 4/1994 | Bosna et al. | 415/200 |
| 5,364,543 | 11/1994 | Bosna et al. | 252/12.2 |
| 5,456,327 | 10/1995 | Denton et al. | 175/371 |
| 5,536,022 | * 7/1996 | Sileo et al. | 415/174.4 |

* cited by examiner

Primary Examiner—Edward K. Look
Assistant Examiner—Richard Woo
(74) Attorney, Agent, or Firm—Gene D. Fleisehhauer

(57) ABSTRACT

A rotary machine (10) having rotor elements (54–66), (114) and seal lands (86, 112) is disclosed. Various construction details are developed for facilitating assembly of the machine. In one embodiment clearances are established between rotor blades (66) and the seal land (86) which enable assembly of the components and provide for acceptable clearances at a steady-state operative condition of the engine.

23 Claims, 7 Drawing Sheets

ROTARY MACHINE

TECHNICAL FIELD

This invention relates to a rotary machine such as a portion of a gas turbine engine having a stator assembly and a rotor assembly. More particularly, it relates in one embodiment to a compressor which has a fan rotor, which has rotor blades and stator vanes, and which has seal lands extending circumferentially with respect to the clearance between the stator assembly and the rotor assembly.

BACKGROUND OF INVENTION

Rotary machines are used to transfer energy between a flow path for working medium gases and rotating elements inside the machine. There are many examples of such machines in widely disparate fields of endeavor.

FIG. 1 shows a side elevation view of the turbofan engine 10 having an axis of rotation Ar. It is one example of a rotary machine of the gas turbine engine type. The turbofan engine is widely used for powering commercial aircraft and military aircraft.

The turbofan engine 10 has a compression section 12, a combustion section 14 and a turbine section 16. The compression section has an annular (core) flowpath 18 for working medium gases. The flowpath leads to the combustion section and thence to the turbine section. In addition, the compression section has an annular bypass flowpath 22 for working medium gases which conducts an annulus of flow around the core flowpath. The flow rate through the bypass duct can be many times the flow rate through the core flowpath 18. In typical commercial turbofan engines, the flow is five (5) times or greater the flow through the core section of the engine.

The core flow path 18 extends through the engine inwardly of the bypass flowpath 22. As the working medium gases are flowed through the engine, the gases are compressed in the compression section 12. The compressed gases are burned with fuel in the combustion section 14 to add energy to gases and expanded through the turbine section 16 to produce power. As the gases are flowed through the turbine section, rotating elements (not shown) receive energy from the working medium gases. The energy is transferred to the compression section by compressing the incoming gases in both the core and bypass flowpaths. A portion of the energy from the turbine section 16 drives large masses of air through the bypass flowpath 22, usually without adding energy to the gases by burning fuel with the gases. Thus, the gases produce useful thrust as they exit the engine at the rear of the engine and at the rear of the bypass duct.

FIG. 2 is a side elevation view of the engine 10 shown in FIG. 1. The engine is partially broken away to show a portion of the interior of the compression section 28. The engine has a low pressure rotor assembly 24 and a high pressure rotor assembly (not shown). The rotor assemblies extend axially through the engine for transferring energy from the turbine section 16 to the compression section 12. The working medium flow path 18 extends through the rotor assemblies. A stator assembly 26 bounds the flowpath and directs the gases as the gases pass through the stages of the rotor assembles.

The compression section includes a first, low pressure compressor 28. The turbine section 16 includes a low pressure turbine 30. The low pressure turbine is the device used to extract energy from the working medium gases. A shaft 32 connects the turbine section to the low pressure rotor assembly 24 in the low pressure compressor. The shaft is typically called the low shaft. A bearing 34 supports the shaft. Energy is transferred via the rotatable low shaft 32 to the low pressure compressor. The shaft drives the low pressure compressor about the axis of rotation Ar at over three thousand revolutions per minute to transfer energy from the low pressure turbine to the low pressure compressor.

The compression section 12 also includes a high pressure compressor 36. The high pressure compressor receives working medium gases from the exit of the low pressure compressor. The high pressure compressor is connected by a second (high) shaft (not shown) to a high pressure turbine. The high shaft is disposed outwardly of the shaft 32 for the low pressure compressor 28. The high pressure compressor is driven by a high pressure turbine 38 downstream of the combustion section 14. The hot working medium gases are then discharged to the low pressure turbine 30 and drive the low pressure turbine about the axis of rotation Ar.

The low pressure compressor 28 is often referred to as the fan-low compressor. Another example of a fan-low compressor is shown the U.S. Pat. No. 4,199,295 issued to Raffy et al. entitled "Method and Device for Reducing the Noise of Turbo Machines." In Raffy and as shown in FIG. 2, the fan-low compressor has a relatively massive fan rotor disk 42. A plurality of relatively massive fan rotor blades 44 extend radially outwardly from the fan rotor disk across the core flowpath 18 and across the by-pass flowpath 22.

FIG. 2A illustrates the relationship during assembly of the engine of the two main subassemblies: a first subassembly of the fan-low compressor with a fan blade 44 installed and another fan blade being installed; and, a second subassembly that comprises the rest of the engine. The fan rotor blades 44 are axially inserted into the fan rotor disk as one of the last steps of assembling the engine. FIG. 2A shows the engine during the method of assembly as discussed below with at least one fan blade 44 installed and with the next fan blade moving on its path of insertion into the rotor disk.

Each fan blade 44 has a root or dovetail 46 which engages a corresponding slot 48 in the fan rotor disk. Alternatively, the fan blade might be pinned to the rotor disk. The low pressure compressor also includes a drum rotor 50 which is part of the low pressure rotor assembly 24. The drum rotor is so called because of its drum-like shape. The drum rotor extends rearwardly from the fan rotor disk.

As shown in FIG. 3, the drum rotor has dovetail attachment members 52. The members adapt the rotor to receive rotor elements such as a plurality of arrays of rotor blades as represented by the rotor blades 54, 56, 58, 62, 64, and 66. The stator assembly 26 has an interior casing or outer case 68 which extends circumferentially about the rotor assembly. The outer case includes a flow path wall 69 for the bypass flowpath. The rotor blades extend radially outwardly across the working medium flow path 18. Each rotor blade has a tip, 30 as represented by the tips 72, 74, 76, 78, 82 84. An outer air seal 85 has outer air seal lands 86 which extend circumferentially about the outer case. The outer seal lands are disposed radially outwardly of the arrays of rotor blades to block the loss of working medium gases from the flowpath. These seal lands, generally called "rubstrips", are in close proximity to the rotor assembly 24. A plurality of arrays of stator vanes, as represented by the stator vanes 92, 94, 96, 98, 102 and 104 extend radially inwardly from the outer case into at least close proximity with the drum rotor. Each stator vane has a tip, as represented by the tip 106.

An inner air seal 108 is disposed between the stator vanes 92–104 and the drum rotor 50. Each inner air seal 108 has a seal land 112 which extends circumferentially about the tips 106 of the stator vanes. The seal land is disposed in at least close proximity to the drum rotor. The drum rotor is adapted by rotor elements, as represented by the knife edge seal elements 114, which extend outwardly and cooperate with the seal land to form the inner air seal. The knife edge seal elements have a greater height than width and are relatively thin. The knife edge elements cut into the seal land under operative conditions as the knife edge elements move radially outwardly under operative conditions. An example of such a construction is shown in U.S. Pat. No. 4,257,753 issued to Bradley et al. entitled "Gas Turbine Engine Seal and Method for Making a Gas Turbine Engine Seal." The seal land in Bradley has a thin film surface layer that is resistant to erosion and provides a small amount of wear to the knife edge element. It may be formed of metallic fibers and a silicone based resin.

Another type of material for the seal land 112 is an elastomeric material such as room temperature vulcanizing rubber. One satisfactory material for the inner air seal land is silicone rubber available as DC93-18 silicone rubber from the Dow Corning Corporation 2200 W Salzburg Rd, Auburn, Mich. 48611. A satisfactory material for the outer air seal land 86 (rubstrip) is available as Dow Corning 3-6891 silicone rubber available from Dow Corning Corporation, Midland, Mich. Each silicone rubber is abradable and accepts rubbing contact with rotating structure without destruction.

An assembly clearance and an operative clearance (clearance under operative conditions) are provided between the rotor 24 assembly and stator assembly 26. Examples are the clearances between the rotor blade tips 72–84 and the outer air seal lands 86; between the knife edge elements 114 and the inner air seal land 112 of the stator vanes 92–104; and, between other locations in the engine where rubbing contact might take place between rotating parts and stationary parts in the low pressure compressor and the low pressure turbine.

The assembly clearance provides a radial distance between the rotor elements rotor (blade, knife edge) and the stator assembly to take into account radial tolerances on the rotor disk 42 or drum rotor 50, the blade 44, stator vanes 92–104, and the seal lands 86, 112. The assembly clearance is necessary to permit initial inspection of the assembly by turning (rotating) the assembly about the axis Ar by hand or at very slow speeds with low force. This inspection ensures that a destructive interference does not occur at some location during normal operations of the engine at high speeds. Such interference might occur between parts of the low pressure compressor 28, between parts of the low pressure turbine 30 and between the low shaft 32 that connects them and other parts of the engine. In addition, the clearance is helpful in assembling the fan rotor blades 44 to the fan rotor disk 42.

During assembly of the gas turbine engine 10, the fan blades 44 are axially inserted into the rotor disk 42. These are inserted one at a time. The rotor disk is turned by hand, bringing the slot 48 receiving the rotor blade to a location where a worker can insert the fan rotor blade while standing in front of the engine or on a small step ladder. However, if the rotor assembly binds, the worker must climb a taller ladder and maintain his balance while maneuvering the very heavy fan blade (sometimes weighing in excess of twenty pounds) into some of the higher oriented slots. As a result, workers will try to force the rotor to turn or request that engine be disassembled and reassembled with more clearance. Sometimes a torque in excess of one thousand foot pounds force (1000 ft-lbf) is required to turn the rotor assembly during assembly of the engine. Such a torque may bend the delicate tips 72–84 of the rotor blades 54–66. Accordingly, a too tight nominal clearance or tight minimum clearance dimension might cause a rotor blade to contact a rubstrip and cause bending of the tip of the rotor blade as attempts are made to rotate the compressor by hand. Too tight a clearance might also decrease engine performance by causing the rotor blades to rip out a rub strip under operative conditions, liberating material which might impact downstream components.

These assembly clearances, if too large, may adversely effect the efficiency of the engine particularly the efficiency of the compressor 28. If too large, the clearance at operative conditions may not close at the cruise condition leaving a gap. The gap of concern is between the rotor element and the adjacent surface of the seal land before and after the rotor element. A gap caused by a rub of the rotor element surprisingly has a small effect on aerodynamic performance. However, a gap with respect to the adjacent structure might create a leak path between the rotor assembly 24 and the compressor, such as between the blade tips and the rubstrip and between the knife edges of the drum rotor and the adjacent seal land carried by the tips of the stator vanes. The gap at cruise provides an escape path for the working medium gases around the rotor blades. The gap at cruise is a concern because the engine may spend a significant amount of time at the cruise condition during long flights.

The nominal clearance at assembly is set within a tolerance band (permitted variation) that trades off the need for aerodynamic efficiency against the need for an acceptable assembly clearance; one that facilitates building the rotor assembly by being able to rotate the rotor assembly 24 by hand at very low speeds during fabrication. Accordingly, the nominal clearance at assembly with its tolerance band sets a radial zone of locations for the rotor elements that avoids too tight or too large clearances. For example, for a rotor blade 54, the nominal value of the clearance might be one-hundred and seventy two (172) mils plus or minus twenty-five mils, that is, with a tolerance band from a maximum clearance dimension of one hundred and ninety seven (197) mils to a minimum clearance dimension of one-hundred and forty seven (147) mils. This radial zone of rotor locations may be applied to an element rotating at over three thousand (3000) revolutions per minute at a four foot diameter.

The radial position of the tolerance band at assembly (nominal assembly clearance) must take into account not only assembly and operative aerodynamic considerations, but also the average diameter Dav of the outer case (e.g. outer seal land 86) at a particular axial location. Typically, the stacking line S for the rotor blades in the assembled condition is used as the axial location at the outer air seal for measuring the average diameter of the seal land. (The stacking line S is the spanwise reference line on which the chordwise extending airfoil sections are disposed perpendicular to the stacking line to define the contour of the rotor blade. The average diameter for the seal land is determined by first measuring the circumference of the seal land at that location and then dividing the circumference by $\pi$ (Dav=C/$\pi$). The value must fall within acceptable limits. There is no factor in the average diameter for any anomalies in the outer case (seal lands 86, 112) which may occur outside these limits as a result of further processing during assembly. These are tolerated because the case is large (often over four feet in diameter) with acceptable limits for the average diameter Dav lying within a range of hundredths of an inch.

The matter is further complicated because drum rotors 50 require further processing which includes an axial extending parting line or split in the outer case. The parting line allows the two halves (or more parts if not cut in half in a longitudinal direction) to be bolted together about the drum rotor to dispose the outer seal lands 86 and the inner seal lands 112 about the rotor elements. Accordingly, the average diameter of the seal land is measured as discussed above (Dav=C/π) prior to cutting the outer case with the rubstrip installed. There are many other approaches for measuring the average diameter Dav at the stacking line. These include using a coordinate measurement machine. The measurement machine measures the diameter at many locations around the circumference at a particular axial location. These measurements are then averaged.

The outer case in many applications is several feet in diameter and may be as thin as one hundred and fifty (150) mils and formed of an aluminum alloy such as Aerospace Materials Specification (AMS) 4312. When the case is reassembled from its component parts some additional circumferential anomalies may be introduced in the installed condition by the flanges on the case.

As a result, gas turbine engines are not built with too tight clearances because the rotor, such as a drum rotor 50, cannot be rotated at assembly. As the prototype engines are built, the rotor is rotated and often the tolerances are increased. A positive minimum clearance dimension is always provided for those rotor blades 54, 56, 58 that grow radially outwardly and rub against the rubstrip while attempting to set the nominal (average) clearance dimension to arrive at a line on line clearance (zero clearance) at the cruise condition.

The arrays of rotor blades 62, 64, 66 in the rear of the compressor adjacent a rapidly converging flow path are different. It has been observed that one or more of these arrays of rotor blades do not tend to rub at the cruise operative condition. These rotor blades have a positive nominal clearance dimension with a minimum clearance dimension that is zero as measured at the stacking line; and with a maximum clearance dimension that is greater than thirty (30) mils in one application.

The rotor blade 66 may have a tip 84 which extends rearwardly (chordwisely) at about the same angle as the rubstrip. However, it is angled slightly inwardly in the spanwise directions to provide a taper in the event of a rub. A rub, which might occur at an extreme Sea Level Take Off operative condition, would cause the tapered tip to cut a trench in the rubstrip that is tapered rearwardly with decreasing depth. This taper is provided for aerodynamic reasons. As a result, the forward most portion of the rotor blade 66 at the minimum zero tolerance dimension might have an interference fit of about one to two mils (0.001–0.002 inches). This slight interference fit is accommodated somewhat by the rotor blades being able to lean slightly in the circumferential direction as a result of assembly tolerances at the base of the rotor blade where the dove tail engages the rotor 50. Thus, as the rotor is turned by hand, the blade will slide along the rubstrip at the average diameter Dav of the rubstrip.

The knife edge seal projections or elements 114 are a third category. These are provided with a minimum clearance and a nominal clearance that is smaller than the forward rotor blades 54, 56, 58 but insures that the knife edges cut a groove under operative conditions and run in the groove in the cruise operative condition on the seal land that each knife edge engages.

In summary, there is tension between the need to minimize the aerodynamic clearance in the cruise operative condition of the engine and the need to be able to assemble and inspect the low pressure compressor and low pressure turbine assembly. The matter is further complicated in that the outer case, having an average diameter, is not a true circle at any axial location but has anomalies that extend inwardly at some locations. In short, if it is difficult to rotate the rotor by hand, the solution is to open the clearance by increasing the minimum clearance dimension or the nominal clearance dimension to increase the clearance and allow the rotor to turn more freely. However, this is accompanied by a decrease in aerodynamic efficiency.

The above art notwithstanding, scientists and engineers working under the direction of Applicants Assignee are seeking to address the twin needs of being able to rotate the low pressure compressor-low turbine rotor assembly during buildup while maintaining clearances that are acceptable for aerodynamic performance.

SUMMARY

This invention is in part predicated on the recognition that applying a lubricant to the surface of a seal land in the low pressure compressor at assembly may reduce frictional forces during assembly to such an extent that an interference fit may be used for the minimum clearance in the rear stage of the compressor and will decrease the operative clearance at the cruise condition in the rear stage of the compressor between the rotor blade and the seal land. It is also in part predicated on the recognition that 1) applying lubricant to the rearmost stages enables the tip of the rotor blade, without bending, to accept a tighter clearance, and 2) that applying the lubricant to other seal lands allows the frictional force at the rearmost seal land to increase without increasing the overall torque required to rotate the rotor assembly beyond that required for an unlubricated assembly.

According to the present invention, a compressor assembly in the installed non-operative condition has an interference fit with the average diameter seal land for the rotor blade at the minimum clearance dimension such that it has an interference fit across the chordwise width of the rotor blade; and, in the operative cruise condition has a clearance as a result of movement of the rotor blade and case relative to each other that is smaller than the same construction not having such an interference fit.

In one detailed embodiment, the gas turbine engine in the installed condition prior the first run of the gas turbine engine under its own power has a lubricant disposed on the surface of at least one seal land in the compressor.

In accordance with one detailed embodiment, the gas turbine engine in the installed condition prior to the first run has lubricant disposed on all seal lands which engage the knife edge elements and on the rearmost seal land adjacent the rear most stage of rotor blades having the interference fit at the minimum tolerance dimension.

In accordance with one embodiment of the present invention, the seal lands are formed of an elastomeric material such as silicone rubber and the lubricant is a silicone oil.

A primary feature of the present invention is a negative minimum clearance dimension between the tip of the rotor blade and the seal land in the non-operative condition where the seal land is at its average diameter Da. Another feature, in one embodiment is the movement characteristic between the non-operative and cruise condition of the tip of the rotor blade bounding the clearance. The tip moves during operation along a path between two axial locations connected by an approximation of a frustoconical angle which is smaller than the frustoconical angle of the seal surface bounding the flow path such that the clearance increases as the rotor blade moves with respect to the original location of the case under rotational forces and reaches the cruise condition. Still another feature of the present invention is the comparison of the operative clearance at the cruise condition as compared to the operative clearance of a rotor tip not having an interference fit with the seal land. In one detailed embodiment the seal land is formed of an elastomeric material, has a silicone oil on the seal land, and is disposed in the engine prior to the first operative run of the engine. Another feature is the condition of the engine after the first operative run and the absence of corrosion from the silicone oil on the rotor and the stator, and the absence of degradation of the seal land.

A primary advantage is the engine efficiency associated with reduced clearance at a seal land which results from the interference fit at a seal land where the clearance normally opens under operative conditions. Another advantage of the present invention is the structural integrity of the engine which results from using a lubricant which both disappears and does not affect the engine components as a result of being disposed in the engine during building of the engine. Still another advantage is the torque characteristic of the engine at the time of assembly of the fan blades to the engine which is less than a hundred foot pounds force in an engine having silicone oil disposed on the seal lands and greater than six hundred foot pounds force (600 ft-lbf) if the lubricant is not installed in the engine prior to assembly of the fan blades.

The foregoing features and advantages of the present invention will become more apparent in light of the following detailed description of the invention and the accompanying drawings.

DETAILED DESCRIPTION OF THE INVENTION

Figure 1:
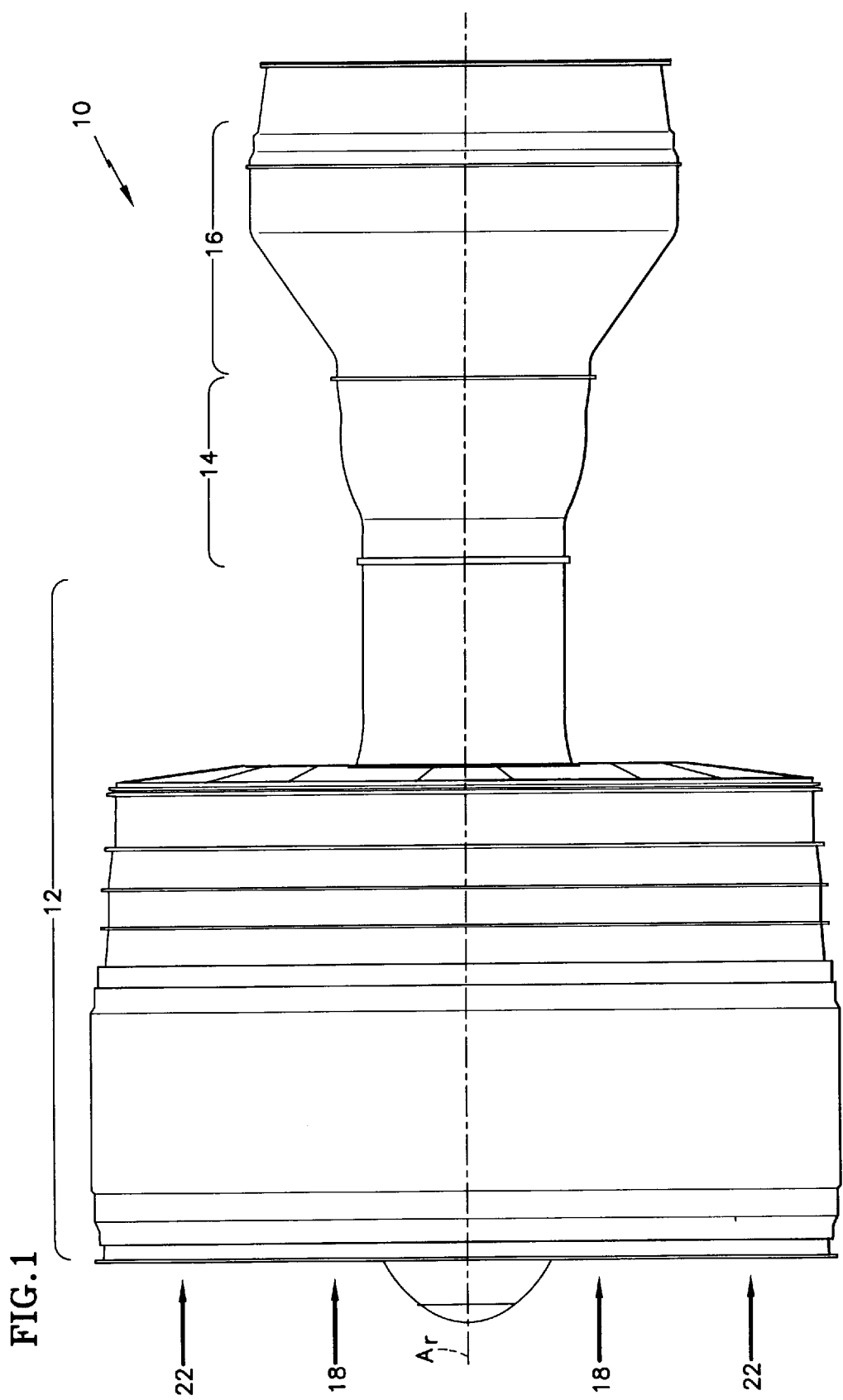
FIG. 1 is a side elevation view of an axial flow rotary machine as represented by the high bypass ratio turbofan gas turbine engine 10.
Figure 2:
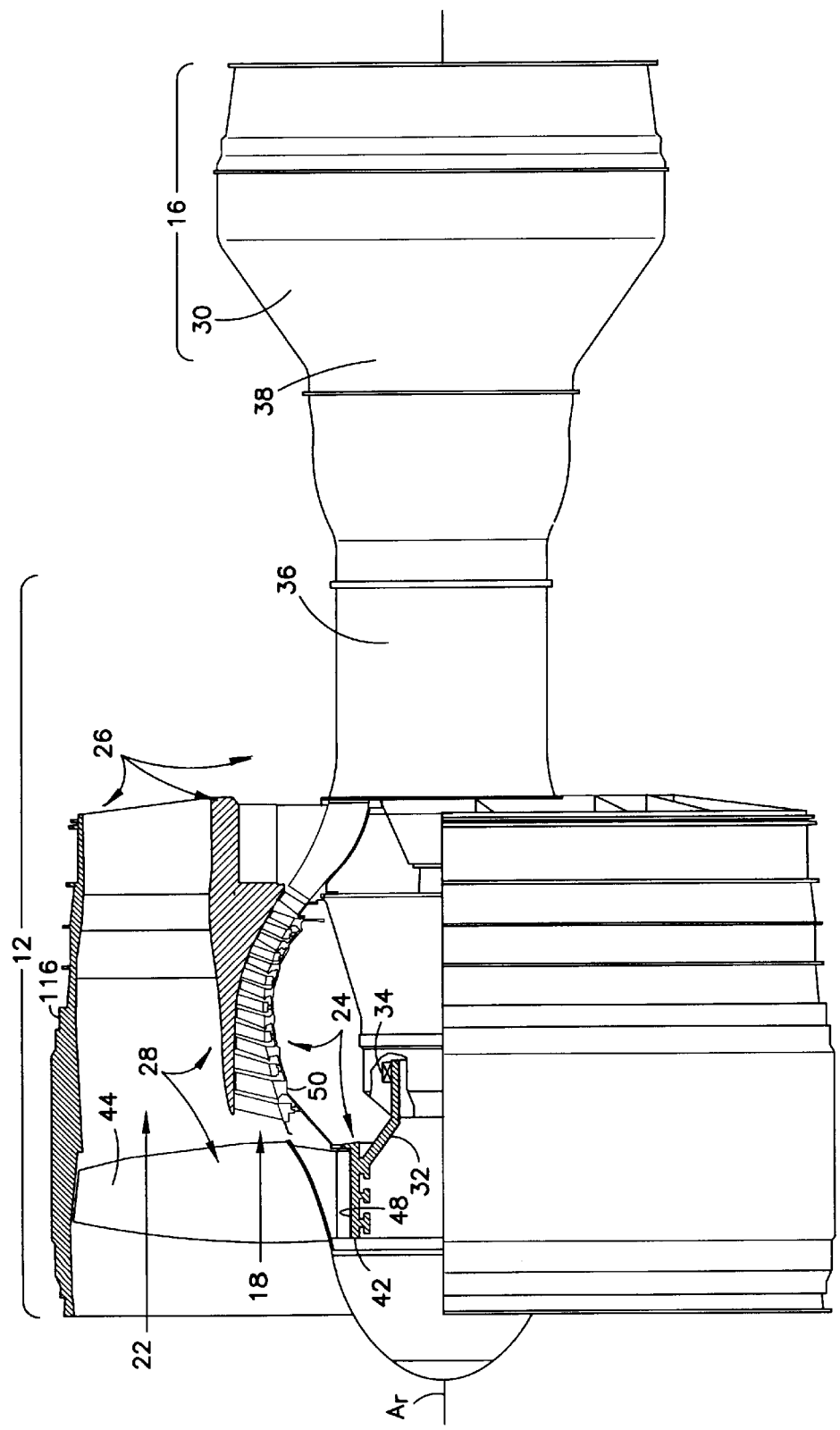
FIG. 2 is a side elevation view of the gas turbine engine shown in FIG. 1 with a portion of the fan case and other engine structure broken away to show a portion of the compression section partially sectioned and partially in full.
Figure 2A:
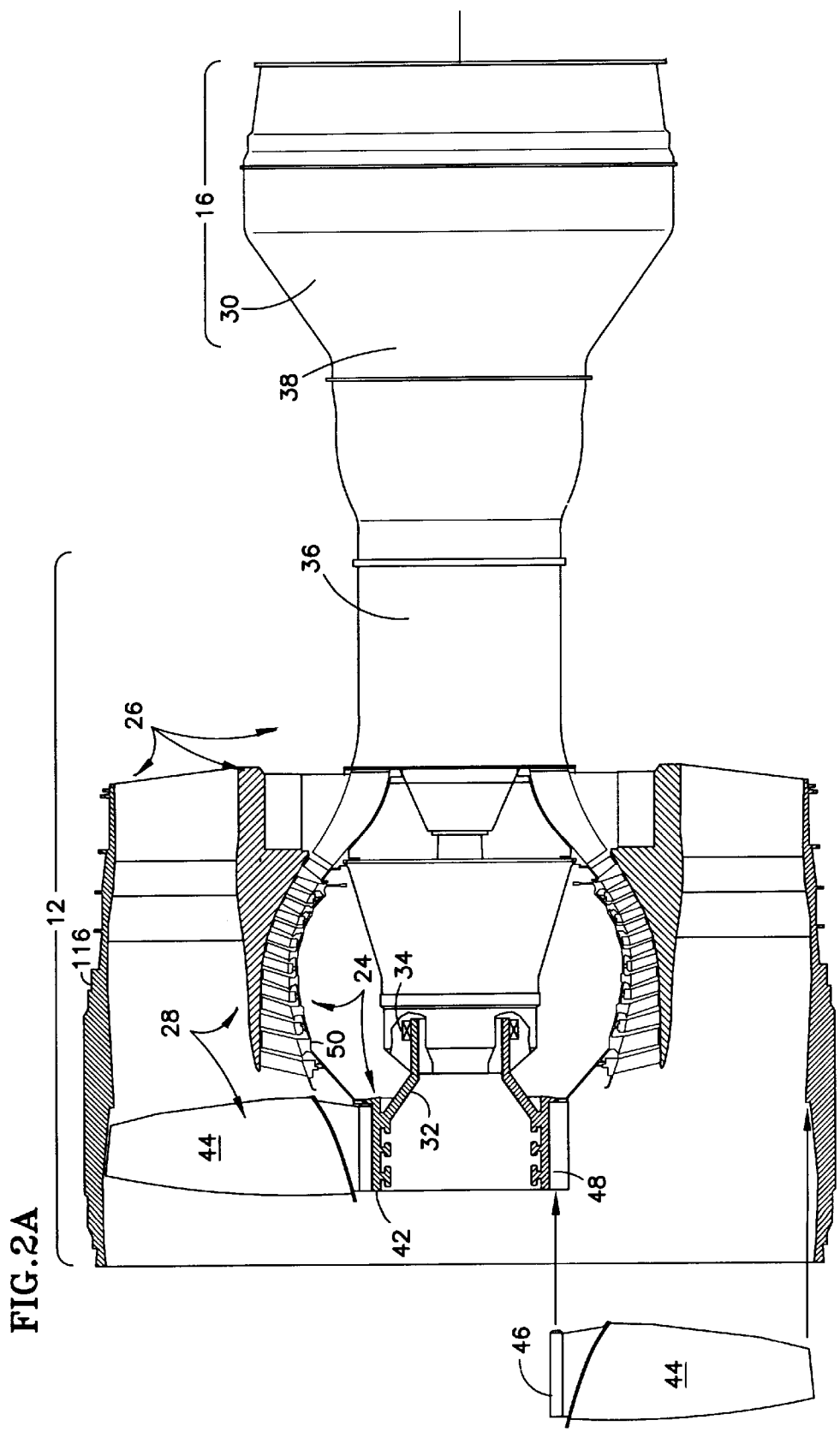
FIG. 2A is a side elevation view corresponding to the view shown in FIG. 2 illustrating the relationship during assembly of the fan low compressor subassembly during insertion of fan blades and a second subassembly that comprises the rest of the engine.

As shown in the FIG. 1 and FIG. 2 side elevation views of the turbofan gas turbine engine, the fan portion of the low pressure compressor has a large diameter fan case 112. The fan case extends about the assembly of the fan rotor disk 42 and fan rotor blades 44. During buildup, the engine 10 is disposed in a fixture for supporting the engine or suspended above the floor. The height of the engine above the floor at the top of the engine can be as much as ten (10) to twelve (12) feet.

Figure 3:
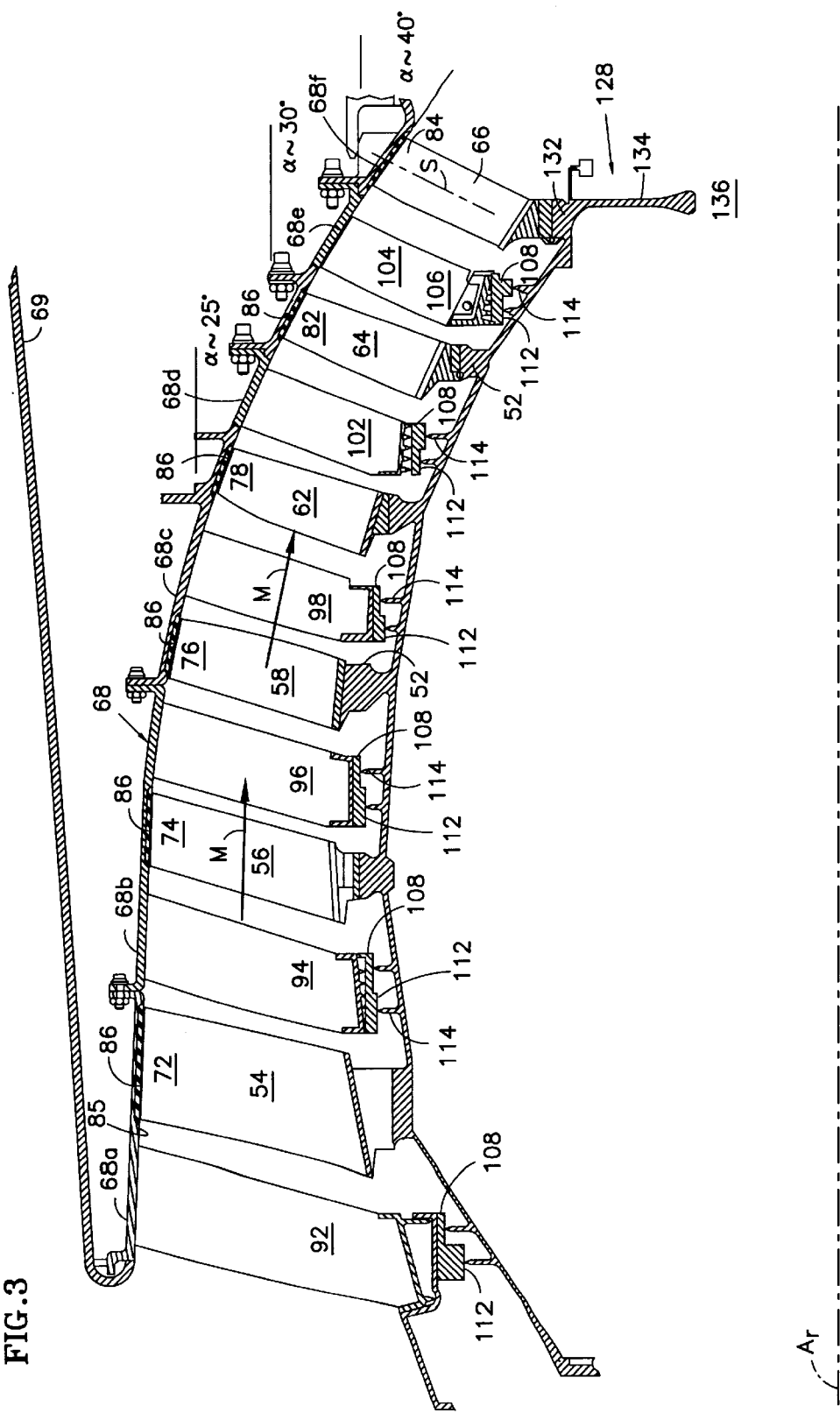
FIG. 3 is an enlarged view of the rotor assembly and stator assembly for the compression section shown in FIG. 2.

FIG. 3 shows a portion of a stator assembly and rotor assembly, as represented by the low pressure rotor assembly 24 shown in FIG. 2. Many other types of stator and rotor assemblies might be formed, each having at least two rotor elements, such as rotor blades and knife edges and having seal lands for the rotor elements. In FIG. 3, the fan rotor disk 42 and the bearing 34 supporting the fan rotor disk are broken away for clarity. The core flowpath 18 for working medium gases has a mean flow line M in the low pressure compressor 28. The mean flowpath line is approximately midway between the drum rotor 50 and the interior case 68 of the engine (commonly referred to as the outer case). The flow path converges radially inwardly in the axial direction with a negative slope with respect to the axial direction. The absolute value of the negative slope is greater in the aft region of the compressor than in the mid region of the compressor. The rubstrips 86 adjacent the rearmost rotor blades 62, 64, 66 are angled inwardly at an angle greater than 15° toward the axis of rotation Ar and in the spanwise direction. The rubstrips form a frustoconical surface which extends circumferentially about the axis rotation $A_r$ of the engine. For example the rubstrip adjacent blade 62 has about a twenty five degree (25°) slope angle ($\alpha=25°$) adjacent blade 64 when intersected by a radial plane containing the axis of rotation Ar. The rubstrip has approximately a thirty degree slope (angle $\alpha=30°$) and the rubstrip at the rearmost stage adjacent blade 66 has approximately a forty degree slope (angle $\alpha=40°$).

Figure 4:
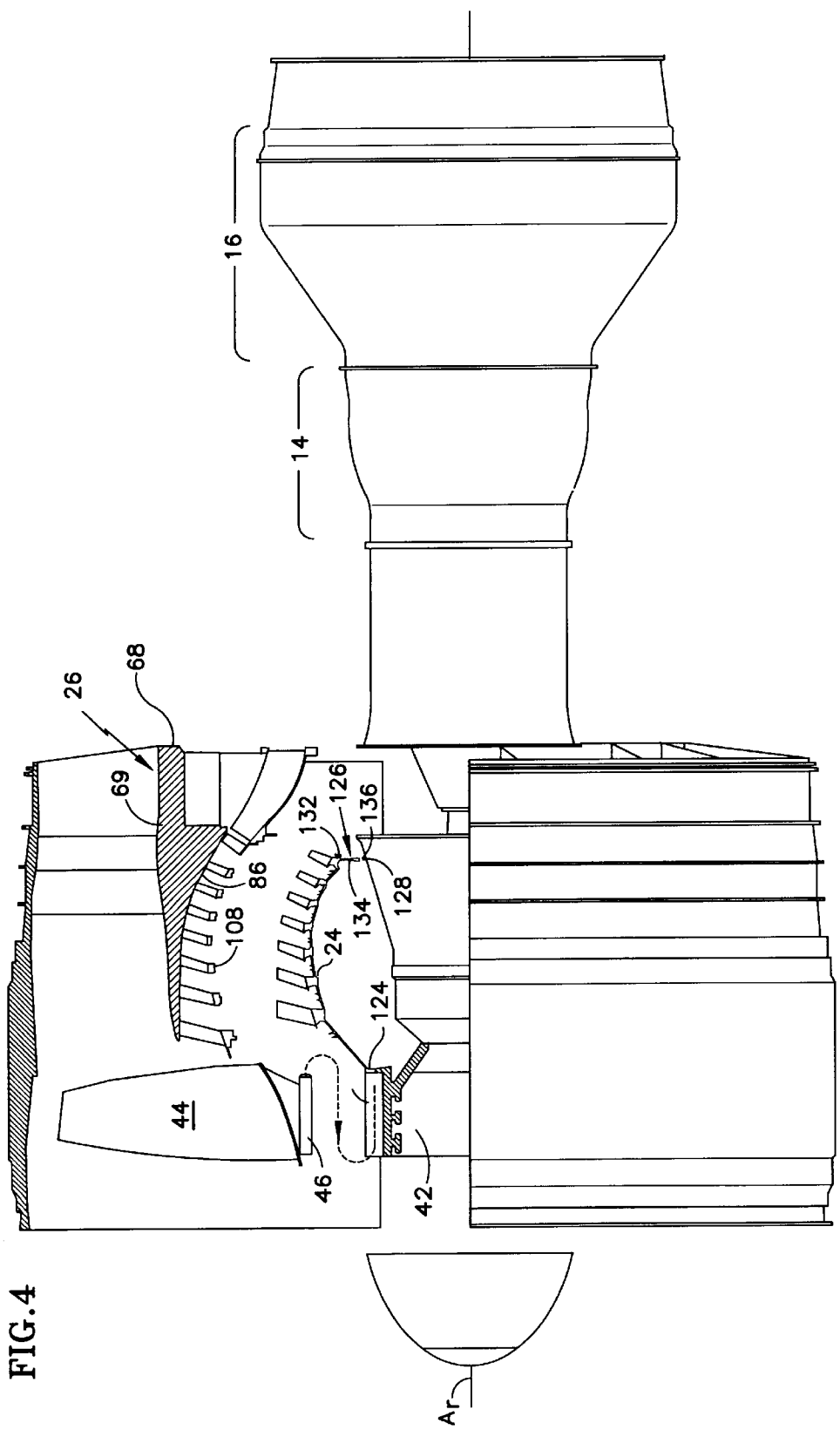
FIG. 4 is a side elevation exploded view of a portion of the compression section of a gas turbine engine showing the relationship of the two halves of the outer case and the stator assembly to the rotor assembly and to the fan blades for the rotor assembly.

FIG. 4 is an exploded schematic view of the engine shown in FIGS. 1–3. The drum rotor 50 extends rearwardly from the fan rotor disk 42. The drum rotor has a first end 124 which is attached to the fan rotor disk to support the drum rotor from the fan rotor disk. The drum rotor has a second end 126 spaced rearwardly from the first end. As shown in FIG. 3 and FIG. 4, The second end has a rearmost rotor disk 128 which includes a rim 132, a web 134, and a bore 136. The bore is spaced radially from the rim by the web. Thus, the drum rotor is fixed at one end and is free to move in the axial direction in response to rotational forces at the other, second end and is constrained against radial movement by the rearmost disk.

The drum rotor has the arrays of rotor blades 54–66. The arrays extend outwardly in a generally radial direction. As used herein the term "radial direction" includes the direction in which the rearmost blades extend which is a direction that is substantially radial.

The stator assembly 26 has the rubstrips 86 which are disposed radially outwardly from each of the arrays of rotor blades. As mentioned, the rubstrips are formed of elastomeric material and have an average diameter Dav in the non-operative condition at the axial location that coincides with the intersection of the stacking lines of the rotor blade with the rubstrip in the non-operative condition. The rubstrips 86 extend rearwardly at about the same angle as the tips 70–82 of the rotor blade. The tips, as mentioned earlier, might be tapered slightly rearwardly in the spanwise direction to cut a tapered trench upon a rub.

The stator assembly 26 includes the outer case 68. The outer case is formed from sections (68a, 68b, 68c, 68d, 68e, 68f) of circumferentially continuous structure. Each section is split longitudinally into at least two axially and circumferentially extending portions. As shown in FIG. 3, the axial sections are bolted together axially and circumferentially to join the halves of the outer case. The flanges on the sections coupled with the relatively large diameter and thinness of the structure cause small anomalies in the roundness (or concentricity) of the outer case. As a result, the case supports and positions the rub strips in such a way that the rubstrip is not a perfect circle at the first axial location.

The rotor blades are is formed of AMS 4928 titanium alloy. The drum rotor 62 is also formed of a material having the same composition as AMS4928 titanium alloy but the drum rotor has been heat treated to have a slightly different material structure. The outer case material is formed of AMS 4312 aluminum alloy. The coefficient of thermal expansion for the outer case material is greater that the coefficient of thermal expansion for the rotor disk and rotor blades and for some material may be as much as two to three times greater than the thermal coefficient of expansion for the drum rotor and rotor blades.

FIG. 4 is helpful in understanding the method of assembling the gas turbine engine shown in FIG. 1 and FIG. 2. A first engine subassembly is formed which is adapted to receive the outer case and will include the outer case after the outer case is installed. The first engine subassembly is shown oriented to receive the outer case. The first engine subassembly includes only part of the low compressor portion of the low pressure rotor assembly (e.g. fan rotor disk, bearing, drum rotor, and rotor blades). It does not include the fan blades and the outer case. At this point, it does not include a second subassembly that exists or will exist that is formed of the fan case, fan struts 123 (partially broken away), high pressure compressor, combustion section 14 and turbine section 16. These are installed later. (The second subassembly is shown in FIG. 2 with respect to the first engine subassembly with the outer case installed and the fan blades being installed.) Returning to FIG. 4, the fan rotor blades are shown exploded away from fan rotor disk and axially positioned above the fan rotor disk for purposes of illustration.

The next step is to dispose a lubricant on one of the seal lands, such as the inner seal lands 112 or on the surface of one of the outer air seal lands 86 (rubstrips) of the low pressure compressor 28. In one embodiment, a lubricant was disposed on the surface of all the inner air seal lands and on the surfaces of the two rearmost, outer air seal lands that are adjacent to rotor blades 64, 66. The seal lands are formed of silicone rubber.

One satisfactory lubricant is silicone oil. One acceptable oil is KF-54 Silicone Oil available from the Shin Etsu Company LTD Tokyo, Japan having offices at 1150 Davmar Drive, Akron, Ohio 44305. This oil was found compatible with the titanium alloy of the drum rotor, the titanium alloy of the blades, the aluminum alloy of the outer case and with the silicone rubber of the outer air seal. The viscosity of the oil is about two hundred (200) centipoise at room temperature and pressure.

The next step is disposing the two halves of the outer case 68 about the first engine subassembly and includes joining the two halves together with bolts. Each of the seal lands has an average diameter Dav at the associated first axial location at the stacking line S. The rotor element has a tolerance band having a minimum and maximum clearance dimension about the nominal clearance dimension as measured with respect to the average diameter Dav. This defines the relative radial position of each seal land with respect to the rotor assembly. Even with a zero minimum clearance dimension or with a positive minimum clearance dimension, there will be rubbing contact over at least a portion of the circumferential travel of a rotor element 54–66, 114 because of deviations in roundness or concentricity in the seal land. Examples of rubbing contact might occur with one of the knife edge elements 114 or with one of the rotor blades such as the rearmost rotor blade 66 because of anomalies in the circumference of the case.

Some time may pass before the first engine subassembly is ready to join the second engine subassembly and then to receive the large rotor blades. For example, the flowpath wall 69 might be part of the first engine subassembly at the time the outer case 68a–f is disposed about the rotor assembly or it may be added after disposing the two halves of the outer case about the rotor assembly. Joining the two subassemblies together readies the engine as shown in FIG. 2 to receive the fan rotor blades. Joining the two subassemblies together does not form part of this invention. It may be done prior to the fan blades being installed or after the fan blades are installed.

As much as two weeks may pass while these other operations are performed on the engine or as the engine awaits the necessary parts or connections to other modules. Accordingly, an advantage of the present invention is the flexibility in time of assembly which results from being able to accept a delay of many days prior to assembling the fan rotor blades to the fan rotor disk. It is related to the viscosity of the lubricant which keeps the lubricant distributed about the seal lands.

The step of installing the fan blades is most easily performed by rotating the low pressure rotor assembly 24 about the axis of rotation to bring the slot of the fan rotor blade to a convenient location. This occurs by applying a torque of less than one hundred foot pounds force (100 ft-lbf) to the rotor assembly. The clearances and anomalies in the diameter of the seal lands have made it difficult to rotate a rotor assembly that engages an unlubricated seal land. This is especially so if the land happens to have an anomaly or tolerance variation that causes a tight actual clearance. On some occasions, torques of over a one thousand foot pounds force (1000 ft-lbf) or even greater have been encountered and have been decreased to less than one hundred foot pounds force (100 ft-lbf) in subsequent trials with lubricant applied to the surfaces of the seal lands.

The fan rotor blades 44 are inserted one at a time during the step of assembling the fan rotor blades to the rotor assembly. The method includes rotating the low pressure rotor assembly 24 about the axis of rotation Ar by applying a torque of less than one hundred foot pounds force (100 ft-lbf) to the rotor assembly. This is a marked reduction from the torque required to rotate an unlubricated assembly. The step is repeated time after time until all fan rotor blades are assembled to the fan rotor disk 42.

Figure 5:
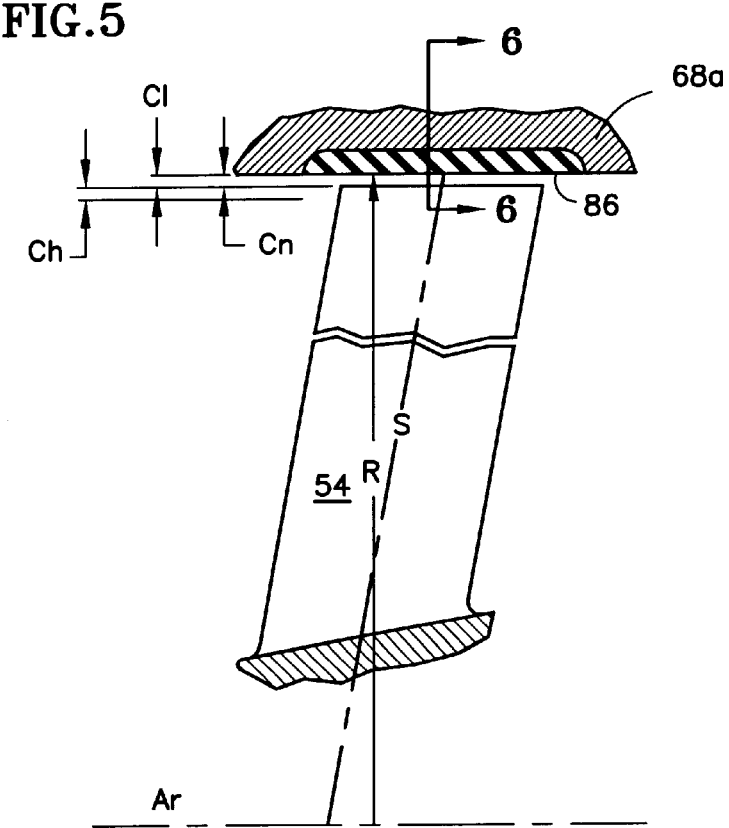
FIG. 5 is a side elevation view of a rotor blade and a circumferentially extending seal land from a rotor blade in the forward portion of the rotor assembly of a low pressure compressor.

FIG. 5 is an enlarged view of one of the rotor blades and an outer seal land at the average diameter Dav of the seal land. Clearances are measured in the true radial direction perpendicular to the ideal axis of rotation Ar of the engine. For example in the field with a rotor blade, clearances are measured by direct comparison. For a rotor blade, the clearance is measured along the stacking line and is then calculated through the angle of the stacking line to the true value along a line R in the radial direction perpendicular to the ideal axis of rotation $A_r$. The line R passes through the intersection of the stacking line S and the tip.

As shown in greatly exaggerated fashion in the assembly condition, the blade tip location has a tolerance applied to the rotor blade which has a nominal clearance dimension Cn, a positive minimum clearance dimension Cl, and a maximum clearance dimension Ch. The minimum clearance dimension Cl is positive, that is, ideally there is a clearance space or gap at the minimum clearance dimension between the blade tip and the average diameter Dav of the outer air seal land 86. During operation, the rotor blade will cut a groove or trench in the outer air seal land. The groove does not decrease aerodynamic performance at the cruise condition to the extent that a positive clearance decreases aerodynamic performance.

Figure 6:
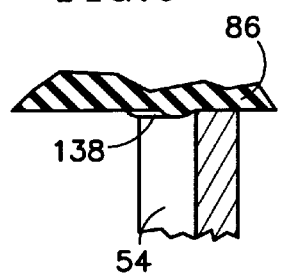
FIG. 6 is a view taken along the line 6—6 of FIG. 5.

As shown in FIG. 6, a too tight clearance Cl or an anomaly in diameter may catch the rotor blade 54. Catching the rotor blade may cause the rotor blade to create a ridge of material 138 in the outer seal land 86 which acts as a barrier to rotational movement in the rotor blade. In one experimental trial, a rotor blade having a ten mil interference fit (Cl=−0.010 inches) with the rearmost rotor stage 66 experienced bending of the tip 84 of the rotor blade at the delicate trailing edge. In another experimental trial, silicone oil was applied to the seal land 86 and new blades having the ten mil interference fit blades were installed. The blades did not bend and the drum rotor turned relatively easily with respect to the seal land.

Figure 7:
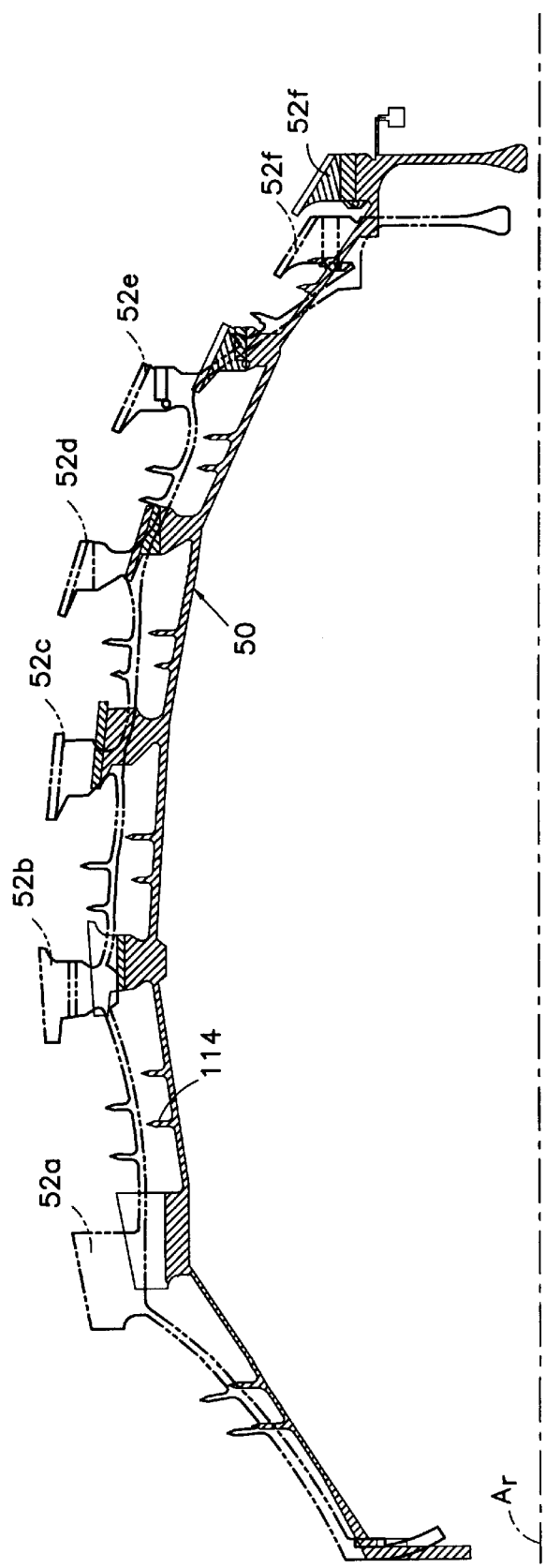
FIG. 7 is schematic representation of the rotor assembly shown in FIG. 4 in a non-operative (static) condition in full and in the operative (dynamic) condition in phantom running at over three thousand revolutions per minute.

FIG. 7 is a schematic representation of movement of the drum rotor 50 shown in FIG. 3 in the static non-operative condition and the dynamic cruise operative condition. The static position is shown in full. The deflected position during rotation at cruise is shown in greatly exaggerated fashion by phantom lines. The drum rotor 50 deflects outwardly under the severe rotational forces that result from rotating the rotor at over three thousand revolutions per minute. This outward movement or growth causes axial (lateral) contraction related in part to axial stresses the Poisson Contraction Effect (Poisson's Ratio). The first end 124 of the drum rotor is fixed to the rotor disk and moves as does the massive fan rotor disk to which it is firmly attached. The relatively heavy dovetail attachments of the drum rotor engage the base of the rotor blades. The dovetail attachment members 52 (represented by the individual dovetail members 52a–52f) move outwardly. The rear dovetail attachment members move forwardly as a result of the axial contraction. The relatively thin material of the drum rotor extending between the dovetail attachments deflects outwardly at the ends. The rearmost rotor disk 128 restrains the second end against radial outward movement. As a result, the second end of the drum rotor moves axially forwardly more than it moves radially outwardly, opening the clearance of the rearmost arrays of rotor blade tips with the rubstrip.

Figure 8:
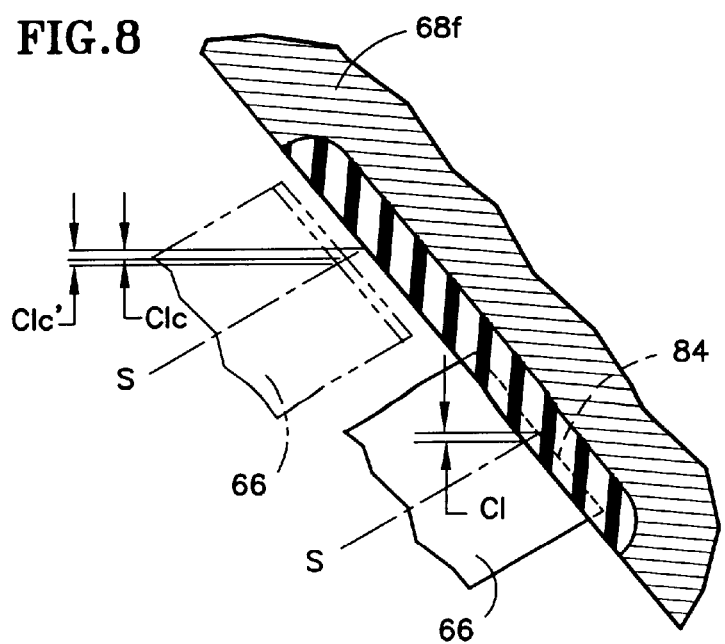
FIG. 8 is a side elevation view in schematic fashion of a rearmost rotor blade and outer air seal (rubstrip) from the aft end of the low pressure compressor.

FIG. 8 is a schematic representation of the relationship of the tip of the rearmost rotor blade to the rubstrip. The blade tip is shown in full and the moved position is shown by the phantom lines at the minimum clearance dimension Cl. The moved position of the rubstrip, which moves outwardly, is not shown. A minimum clearance dimension of zero at the stacking line results in a minimum clearance dimension at cruises which is positive, allowing working medium gases to escape around the tips of the rotor blades. Setting the minimum clearance dimension at an interference fit of ten mils (Cl=−0.010 inches) or greater at the stacking line and lubricating the rearmost rubstrip with silicone oil, allows the rotor blade to be turned by hand during assembly and yet as the clearance opens up, the minimum clearance dimension Clc at the cruise operative condition might be still negative. If positive at the cruise condition as shown, the minimum clearance dimension Clc is still smaller than the minimum clearance dimension Clc' if the initial assembly minimum clearance dimension was zero shown by the dotted line in the moved position or, even worse, if it were a positive minimum clearance dimension not having an interference fit at assembly. This will greatly increase the efficiency of the array of rotor blades and the operational efficiency of the compressor.

Lubricating the inner air seal lands will further reduce frictional forces at assembly. This saving in frictional force may be used to tighten nominal assembly clearances further without making it impossible to rotate the drum rotor 50. However, care must be taken that the frictional force at the rearmost seal land does not deform the rotor blade during assembly. Accordingly, it may be possible to reduce the clearance at the rearmost seal land without lubricating that particular seal land. Another way to decrease the friction of the inner air seal lands would be to run the engine with relatively short blades at the rearmost stage, and run in the knife edge elements to the inner air seal lands. Thereafter, the engine would be disassembled and reassembled with longer rotor blades in the rearmost disk.

Accordingly, the use of the silicone oil can permit clearances that provide for a minimum clearance dimension that is negative during assembly to such an extent that the rotor blade has a minimum negative clearance across the entire tip of the rotor blade in the chordwise direction.

Experimental trials were run to demonstrate the compatibility of the silicone oil to the structure of the engine. For example, the engine was found to rotate freely after assembly by applying the silicone oil to the seal land for a pilot lot of blades which normally would cause difficulty in rotating the engine by hand. After testing the engine was torn down for inspection. No trace of residual oil was found on any of the applied surfaces and all rub surfaces appeared normal. Oil residue did tend to collect fine rubber particles generated during the initial rub on some stages, such as the inner air seals. The blade tips collected trace amounts of fine silica (which are also typical after non-lubricated initial rub events. These were left over after the oil evaporated at the elevated temperatures of the flow path during the operative conditions of testing.

The silicone rubber was checked through a fluid exposure test in which durometer readings were taken and found unchanged after periods which demonstrated the compatibility of the silicone oil with the silicone rubber. In addition, the silicone oil and the residue was compatible with the titanium alloy of the low pressure compressor and of the high pressure compressor.

Although the invention has been shown and described with respect to detailed embodiments thereof, it should be understood by those skilled in the art that various changes in form and detail may be made without departing from the spirit and scope of the claimed invention.

We claim:

1. An axial flow gas turbine engine having an axis of rotation Ar which includes a compressor having a flow path for working medium gases, the flow path having a mean flow line in the compressor which converges radially inwardly with a negative slope whose absolute value is greater at the aft region of the compressor than the midregion of the compressor, and a bearing for supporting a rotor assembly, which comprises:

a rotor assembly having
- a rotor member supported from the bearing,
- a plurality of rotor blades extending outwardly from the rotor member, and
- at least one knife edge seal element disposed on the rotor member, extending circumferentially about the rotor member and extending outwardly from the rotor members;

a stator assembly which extends circumferentially about the rotor assembly which includes,
- at least one circumferentially extending seal land disposed radially outward of each of said knife edge seal elements and at least one circumferentially extending rubstrip disposed radially outward of each of said arrays of rotor blades, the first rubstrip being disposed outwardly of the first array of rotor blades, each seal land and rubstrip having an associated average diameter Dav in the non-operative condition at the first axial location, the rubstrip being disposed about said array of rotor blades and extending rearwardly at about the same angle as the tip of the rotor blade and being radially oriented with respect to the airfoil tip with a nominal clearance dimension and a tolerance band having a minimum clearance dimension and a maximum clearance dimension, and
- an outer case which engages each rubstrip to support and position the rubstrip such that the rubstrip is not a perfect circle at the first axial location;

wherein the rotor blade has a stacking line S and the first axial location is axially aligned with the intersection of the stacking line S with the tip of the rotor blade and wherein the rotor blade and the rubstrip at the average diameter Dav have an interference fit at the minimum clearance dimension with the average diameter Dav of the rubstrip in the non-operative condition;

wherein the clearance between said rotor blade and said rubstrip of the outer air seal increases under operative conditions and the arrays of rotor blades move axially forwardly toward the bearing and away from the frustoconical outer air seal; and, wherein the clearance is smaller than if the same tolerance band were used and the minimum clearance was not an interference fit at said first axial location.

2. The gas turbine engine as claimed in claim 1 wherein the member is formed of titanium alloy having a first coefficient of expansion, the rotor blades are formed of a titanium alloy having a second coefficient of thermal expansion and the outer case is formed of an aluminum alloy having a third coefficient of thermal expansion which is greater than twice the coefficient of thermal expansion of the titanium alloy of the drum rotor and is greater than twice the coefficient of thermal expansion of the titanium alloy of the rotor blades.

3. The gas turbine engine as claimed in claim 2 wherein the first coefficient of thermal expansion is equal to the second coefficient of thermal expansion.

4. The gas turbine engine as claimed in claim 1 wherein the first seal land is formed of a silicone rubber and wherein prior to the first run of the gas turbine engine the first seal land has a lubricating medium disposed on the surface which was applied to the first seal land to facilitate rotation of the rotor assembly about the axis of rotation prior to the first run of the engine.

5. The gas turbine engine of claim 4 wherein silicone oil is disposed in the said rearmost seal lands during assembly to facilitate rotation of the rotor assembly during final test and inspection.

6. The gas turbine engine as claimed in 4 wherein the engine further includes a plurality of inner air seal lands extending circumferentially about the stator structure at each knife edge seal element outwardly of the knife edge seal element and wherein a lubricant is disposed on the surface of the inner air seal lands prior to the first run of the engine to facilitate rotation of the rotor assembly about its axis during assembly and test.

7. The gas turbine engine as claimed in 6 wherein the seal lands are formed of a silicone rubber and wherein the lubricant disposed on the surface of the seal lands is a silicone oil.

8. The gas turbine engine as claimed in claim 1 wherein the engine further includes a plurality of inner air seal lands extending circumferentially about the stator structure at each knife edge seal element outwardly of the knife edge seal element and wherein a lubricant is disposed on the surface of the inner air s seal lands prior to the first run of the engine to facilitate rotation of the rotor assembly about its axis during assembly and test; and,
- wherein the gas turbine engine has a torque characteristic prior to the first operative run of the engine which is greater than six hundred foot pounds force without lubrication disposed on the surface of the inner air seal lands and on the first seal land rub strip and a torque characteristic which is less than one-hundred foot pounds force with lubricant disposed on said seal lands.

9. The gas turbine engine as claimed in claim 1 wherein the tips of each of the rotor blades in the first array of rotor blades has an interference fit around the entire circumference of the seal land rubstrip in the installed condition prior to the first run of the engine.

10. The gas turbine engine as claimed in claim 1 wherein the interference fit is at least ten mils.

11. The gas turbine engine as claimed in claim 1 wherein the outer case has an average diameter Dac in the operative cruise condition of the engine; and wherein the interference fit is of such an extent that at the cruise operative condition of the gas turbine engine the nominal clearance dimension of the array of rotor blades is line on line with the average diameter Dac of the rubstrip at the cruise operative condition.

12. An axial flow gas turbine engine having an axis of rotation Ar which includes a compressor having a flow path for working medium gases, the flow path having a mean flow line in the compressor which converges radially inwardly with a negative slope whose absolute value is greater at the aft region of the compressor than the midregion of the compressor, and a bearing for supporting a rotor assembly, which comprises:
- a rotor assembly having
  - a rotor shaft which engages the bearing,
  - a fan rotor disk rotatable with the shaft and supported from the bearing, the fan rotor disk having a rim, a web and a bore,
  - a plurality of fan rotor blades extending outwardly from the rotor disk, and
  - a drum rotor extending rearwardly from the fan rotor disk, the drum rotor assembly having a
    - A. first end which is attached to the fan rotor disk to support the drum rotor from the fan rotor disk,
    - B. a second end spaced rearwardly from the first end having a rearmost rotor disk and blade assembly, the rotor disk including a rim, a web and a bore which is spaced radially from the rim by the web,
    - C. at least three arrays of rotor blades, the arrays being spaced axially one from the other and extending outwardly in a generally radial direction from the drum rotor, at least one of the arrays of rotor blades being a first array of rotor blade having a tip at each rotor blade which is angled toward the axis Ar in the rearward direction with an angle greater than fifteen degrees (15°) as measured from a reference line parallel to the axis Ar and passing through the top of the airfoil at a first axial location, D. at least one knife edge seal element disposed between each pair of arrays of rotor blades, each element extending circumferentially about the drum rotor and extending outwardly from the drum rotor;

a stator assembly which extends circumferentially about the rotor assembly which includes, at least one circumferentially extending seal land disposed radially outward of each of said knife edge elements and at least one circumferentially extending rubstrip disposed radially outwardly of each of said arrays of rotor blades in the low pressure compressor, the first rubstrip being disposed outwardly of the first array of rotor blades and being formed of an elastomeric material, the rubstrip having an average diameter Dav in the non-operative condition at the first axial location, the rubstrip being disposed about said array of rotor blades and extending rearwardly at about the same angle as the tip of the rotor blade and being radially oriented with respect to the airfoil tip with a nominal clearance dimension and a tolerance band having a minimum clearance dimension and a maximum clearance dimension, an outer case formed from a circumferentially continuous structure which is split longitudinally into at least two axially and circumferentially extending portions, the circumferentially extending portions being joined together in the assembled condition and supporting and positioning the rubstrip such that the rubstrip is not a perfect circle at the first axial location;

wherein the rotor blade has a stacking line S and the first axial location is axially aligned with the intersection of the stacking line S with the tip of the rotor blade and wherein the rotor blade and the rubstrip at the average diameter Dav have an interference fit at the minimum clearance dimension with the average diameter Dav of the rubstrip in the non-operative condition;

wherein the clearance between said rotor blade and said rubstrip of the outer air seal increases under operative conditions as the midportion of the rotor assembly deflects radially outwardly and the arrays of rotor blades move axially forwardly toward the bearing and away from the frustoconical outer air seal; and, wherein the clearance is smaller than if the same tolerance band were used and the minimum clearance was not an interference fit at said first axial location.

13. The gas turbine engine as claimed in claim 12 wherein the drum rotor is formed of titanium alloy having a first coefficient of expansion, the rotor blades are formed of a titanium alloy having a second coefficient of thermal expansion and the outer case is formed of an aluminum alloy having a third coefficient of thermal expansion which is greater than twice the coefficient of thermal expansion of the titanium alloy of the drum rotor and is greater than twice the coefficient of thermal expansion of the titanium alloy of the rotor blades.

14. The gas turbine engine as claimed in claim 13 wherein the first coefficient of thermal expansion is equal to the second coefficient of thermal expansion.

15. The gas turbine engine as claimed in claim 12 wherein the first seal land is formed of a silicone rubber and wherein prior to the first run of the gas turbine engine the first seal land has a lubricating medium disposed on the surface which was applied to the first seal land to facilitate rotation of the rotor assembly about the axis of rotation prior to the first run of the engine.

16. The gas turbine engine of claim 15 wherein silicone oil is disposed in the said rearmost seal lands during assembly to facilitate rotation of the rotor assembly during final test and inspection.

17. The gas turbine engine as claimed in 15 wherein the engine further includes a plurality of inner air seal lands extending circumferentially about the stator structure at each knife edge seal element outwardly of the seal element and wherein a lubricant is disposed on the surface of the inner air seal lands prior to the first run of the engine to facilitate rotation of the rotor assembly about its axis during assembly and test.

18. The gas turbine engine as claimed in 17 wherein the seal lands are formed of a silicone rubber and wherein the lubricant disposed on the surface of the seal lands is a silicone oil.

19. The gas turbine engine as claimed in claim 12 wherein the engine further includes a plurality of inner air seal lands extending circumferentially about the stator structure at each knife edge seal element outwardly of the knife edge seal element and wherein a lubricant is disposed on the surface of the inner air seal lands prior to the first run of the engine to facilitate rotation of the rotor assembly about its axis during assembly and test; and, wherein the gas turbine engine has a torque characteristic prior to the first operative run of the engine which is greater than six hundred foot pounds force without lubrication disposed on the surface of the inner air seal lands and on the first seal land rub strip and a torque characteristic which is less than one-hundred foot pounds force with lubricant disposed on said seal lands.

20. The gas turbine engine as claimed in claim 12 wherein the tips of each of the rotor blades in the first array of rotor blades has an interference fit around the entire circumference of the seal land rubstrip in the installed condition prior to the first run of the engine.

21. The gas turbine engine as claimed in claim 12 wherein the interference fit is at least ten mils.

22. The gas turbine engine as claimed in claim 12 wherein the outer case has an average diameter Dac in the operative cruise condition of the engine; and wherein the interference fit is of such an extent that at the cruise operative condition of the gas turbine engine the nominal clearance dimension of the array of rotor blades is line on line with the average diameter Dac of the rubstrip at the cruise operative condition.

23. The gas turbine engine as claimed in claim 12 wherein the interference fit in the non-operative condition is such that the nominal clearance dimension is line on line with the average diameter Dav of the rubstrip.

* * * * *